(12) United States Patent
Wang et al.

(10) Patent No.: US 8,295,251 B2
(45) Date of Patent: Oct. 23, 2012

(54) WIRELESS HIGH-DATE RATE COMMUNICATIONS

(75) Inventors: Shu Wang, San Diego, CA (US);
Hong-Kui Yang, San Diego, CA (US)

(73) Assignee: VIA Telecom, Inc., San Diego, CA (US)

( * ) Notice: Subject to any disclaimer, the term of this patent is extended or adjusted under 35 U.S.C. 154(b) by 405 days.

(21) Appl. No.: 12/626,767

(22) Filed: Nov. 27, 2009

(65) Prior Publication Data
US 2010/0135258 A1 Jun. 3, 2010

Related U.S. Application Data

(60) Provisional application No. 61/118,484, filed on Nov. 28, 2008, provisional application No. 61/118,485, filed on Nov. 28, 2008.

(51) Int. Cl.
*H04J 3/00* (2006.01)
(52) U.S. Cl. ........................................................ 370/336
(58) Field of Classification Search .................. None
See application file for complete search history.

(56) References Cited

U.S. PATENT DOCUMENTS

| | | | |
|---|---|---|---|
| 2004/0174941 A1* | 9/2004 | Kajita et al. | 375/340 |
| 2005/0068884 A1* | 3/2005 | Yoon et al. | 370/203 |
| 2007/0248045 A1* | 10/2007 | Nagaraj | 370/329 |
| 2008/0037615 A1* | 2/2008 | Chan et al. | 375/150 |
| 2008/0112383 A1* | 5/2008 | Li | 370/342 |
| 2010/0290419 A1* | 11/2010 | Wengerter | 370/329 |
| 2011/0158104 A1* | 6/2011 | Frenger et al. | 370/241 |

* cited by examiner

*Primary Examiner* — John Blanton
(74) *Attorney, Agent, or Firm* — Richard K. Huffman; James W. Huffman

(57) ABSTRACT

A base station apparatus is provided. The base station apparatus includes an orthogonal frequency division multiplexed (OFDM) encoder and a time division multiplexer. The OFDM encoder is configured to encode a plurality of data streams into a corresponding plurality of OFDM tones, where one of the corresponding plurality of OFDM tones includes an OFDM preamble tone that indicates a mapping of remaining OFDM tones within the plurality of OFDM tones to one or more of a plurality of mobile stations, and indicates at least one of the plurality of tones addressed to a particular mobile device, and wherein the preamble tone is not fixed to the selected particular mobile device through communication. multiplexes a plurality of streams over a forward link channel for receipt by the plurality of mobile stations, where the corresponding plurality of OFDM tones are encoded as one of the plurality of streams.

15 Claims, 7 Drawing Sheets

MIXED CONNECTION EXAMPLE

PRESENT DAY EV-DO FORWARD LINK FRAME

BASE STATION MECHANISM FOR MANAGING SUB-BAND INTERFERENCE

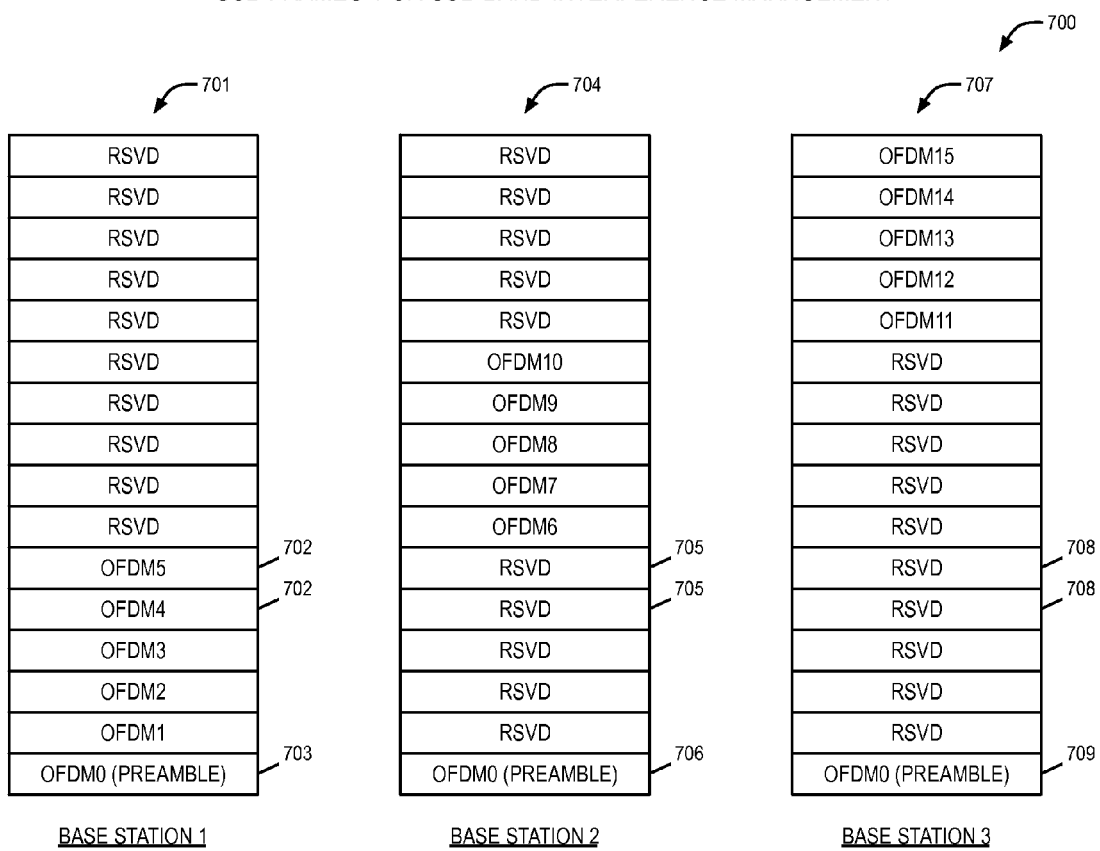

WIRELESS HIGH-DATE RATE COMMUNICATIONS

CROSS-REFERENCE TO RELATED APPLICATIONS

This application claims the benefit of the following U.S. Provisional Applications, each of which is herein incorporated by reference for all intents and purposes.

| SERIAL NUMBER | FILING DATE | TITLE |
| --- | --- | --- |
| 61118484 (VTU.09-0005-US) | Nov. 28, 2008 | WIRELESS HIGH-DATE RATE COMMUNICATIONS |
| 61118485 (VTU.09-0006-US) | Nov. 28, 2008 | OFDMA SUBBAND INTERFERENCE MANAGEMENT AND MULTIUSER MULTIPLEXING |

BACKGROUND OF THE INVENTION

1. Field of the Invention

This invention relates in general to the field of cellular communications, and more particularly to a method and apparatus for improving the communications throughput over a cellular network.

2. Description of the Related Art

The cell phone industry is undergoing exponential growth, not only in the this country, but all over the world. In fact, it is well known that the over twenty percent of the adult population in the United States do not even have a traditional landline telephone. In addition to those who do not own a conventional telephone, nearly ninety percent of the adult population owns a wireless phone.

And the usage of cell phones is increasing as well over the use of traditional landline telephone coverage. In fact, one in seven adults now uses only cell phones. Whereas in the past cell phones were used when a landline was not available or under emergency conditions, lower carrier rates, affordability of family packages, and free mobile-to-mobile or friend-to-friend promotions have fostered in significant increases in usage. It is not uncommon today to walk into any public forum or facility and notice a majority of the people there talking on their cell phones.

The ability to communicate using a mobile phone, or mobile station, has been available since the middle of the last century. However, during the 1990's so-called "2G" or second generation mobile phone systems were provided that began the growth in both deployment and usage that we currently enjoy today. These initial systems predominately provided for the routing and reliable servicing of voice calls between parties. And, as one skilled in the art will appreciate, there are a number of timing and latency requirements associated with transmission and reception of voice data in order to maintain quality of service.

And although wireless cellular network technologies have continued to provide improvements related to the ability to process voice calls, there has also been an enormous pull on the industry to provide improvements related to the processing of data as well as voice. It is not uncommon today to find many cell phone users who not only place voice calls over a cellular network, but who also check their email, send text messages, and browse the internet.

Accordingly, a number of technologies are under development to improve the quality and throughput of data. These so-called "3G" or third generation cellular communications technologies are highly optimized for the reliable transfer of packet data instead of voice data. Hence, 3G data protocols such as EDGE® and EV-DO technologies are not generally characterized modulation techniques, but more so by performance metrics (e.g., 5 Megabits per second throughput). And this is because although a given data connection must be guaranteed some minimal level of latency and throughput, the timing required to transfer data such as a text message pales in comparison to that required to transfer voice information.

However, as one skilled in the art will appreciate, there are other means for processing voice calls that over a conventional cellular voice network. For example, voice over internet protocol (VOIP) has been used for many years as one way of taking advantage of the throughput capabilities of a high speed data network in order to send and receive voice information. And while cellular providers are certainly embracing VOIP to increase their network's ability to process a greater number of voice calls, the present inventors have noted that when a data network such as EV-DO is utilized in part to process VOIP calls, the throughput potential of that network significantly decreases due to the timing constraints associated with the processing of voice. More specifically, to maintain quality of service, voice information must be transmitted regularly and frequently, typically every 20 milliseconds. And when a packetized data network such as an EV-DO network is employed to transmit VOIP data, because EV-DO is a time division multiplexed delivery protocol, the timing requirements of VOIP dictate that regular time slots be allocated and reserved for the data associated with a VOIP call—regardless of the amount of voice data that is to be transmitted, which is most often a small amount of data relative to the data network's throughput ability.

Consequently, the present inventors have noted the inefficiencies associated with the utilization of data networks such as EV-DO to process VOIP data in addition to other types of data. They have observed significant decreases in these data networks throughput rates as a function of the number of VOIP calls which are processed.

Accordingly, what is needed is a technique that enables a cellular data network to process increasing numbers of VOIP calls that does not notably affect the network's throughput rate.

In addition, what is needed is an apparatus and method for interlacing VOIP data and other forms of data within an existing data protocol in order to maximize the data transfer rate.

What is also needed is a mechanism for processing VOIP calls over a data network that leverages unused bandwidth of an existing data network, but which also compatible with legacy cellular devices.

SUMMARY OF THE INVENTION

The present invention, among other applications, is directed to solving the above-noted problems and addresses other problems, disadvantages, and limitations of the prior art.

The present invention provides a superior technique for increasing the throughput of a cellular data network, particularly when that network is being employed to service VIOP calls. In one embodiment, a base station wirelessly coupled to a plurality of mobile devices, comprising a data encoder and a time division multiplexer. The data encoder is configured to receive a preamble signal and a plurality of data streams, which are encoded into a corresponding preamble tone and a corresponding plurality of tones, wherein the preamble tone indicates a mapping of the plurality of tones in response to one or more of the plurality of mobile devices, and wherein the preamble tone indicates at least one of the plurality of tones which are addressed to a particular mobile device, and wherein the preamble tone is not fixed to the selected particular mobile device through communication. The time division multiplexer is coupled to said data encoder, configured to multiplex the preamble tone and the plurality of tones in timely fashion for receipt by the plurality of mobile devices.

One aspect of the present invention contemplates a method for a base station wirelessly coupled to a plurality of mobile devices, comprising receiving and encoding a preamble signal and a plurality of data streams into a corresponding preamble tone and a corresponding plurality of tones, wherein the preamble tone indicates a mapping of the plurality of tones in response to one or more of the plurality of mobile devices, and wherein the preamble tone indicates at least one of the plurality of tones which are addressed to a particular mobile device, and wherein the preamble tone is not fixed to the selected particular mobile device through communication; and multiplexing the preamble tone and the plurality of tones in timely fashion for receipt by the plurality of mobile devices.

One aspect of the present invention comprehends a mobile device wirelessly coupled to a plurality of base stations, comprising a decoder, a preamble decoder and a processor. The decoder, configured to demultiplex and decode a plurality of tones received from at least one of the plurality of base stations. The preamble decoder, configured to decode a preamble tone received from at least one of the plurality of base stations, wherein the decoded preamble tone indicates one or more of the plurality of tones are transmitted for the mobile device, and wherein the preamble tone is not fixed to the mobile device through communication. And the processor, coupled to said decoder and said preamble decoder, configured to process one or more of the plurality of tones indicated by the decoded preamble tone, and send a data rate control signal of the corresponding base station.

One aspect of the present invention comprehends a method for a mobile device wirelessly coupled to a plurality of base stations, comprising demultiplexing and decoding a plurality of tones received from one of the plurality of base stations; decoding a preamble tone received from one of the plurality of base stations, wherein the decoded preamble tone indicates one or more of the plurality of tones are transmitted for the mobile device, and wherein the preamble tone is not fixed to the mobile device through communication; processing one or more of the plurality of tones indicated by the decoded preamble tone; and sending a data rate control signal of the corresponding base station.

Another aspect of the present invention comprehends a system comprising a plurality of base station and a plurality of mobile device. Each of the plurality of base station, further comprising a data encoder, and a time division multiplexer. The data encoder, configured to receive a preamble signal and a plurality of data streams, which are encoded into a corresponding preamble tone and a corresponding plurality of tones, wherein the preamble tone indicates a mapping of the plurality of tones in response to one or more of the plurality of mobile devices, and wherein the preamble tone indicates at least one of the plurality of tones which are addressed to a particular mobile device, and the preamble tone is not fixed to the selected particular mobile device through communication. The time division multiplexer, coupled to said data encoder, configured to multiplex the preamble tone and the plurality of tones in timely fashion for receipt by the plurality of mobile devices. Each of the plurality of mobile device, wirelessly couple to one or more of the plurality of base stations, further comprising a decoder, a preamble decoder, and a processor. The decoder, configured to demultiplex and decode the plurality of tones received from at least one of the plurality of base stations. The preamble decoder, configured to decode the preamble tone received from at least one of the plurality of base stations, wherein the decoded preamble tone indicates one or more of the plurality of tones are transmitted for the mobile device; and The processor, coupled to said decoder and said preamble decoder, configured to process one or more of the plurality of tones indicated by the decoded preamble tone, and send a data rate control signal of the corresponding base station.

BRIEF DESCRIPTION OF THE DRAWINGS

These and other objects, features, and advantages of the present invention will become better understood with regard to the following description, and accompanying drawings where:

FIG. 7 is a block diagram showing data sub-frames corresponding to three base stations according to one embodiment of the present invention when the base stations are communicating with mobile stations in a sub-band interference reduction mode.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
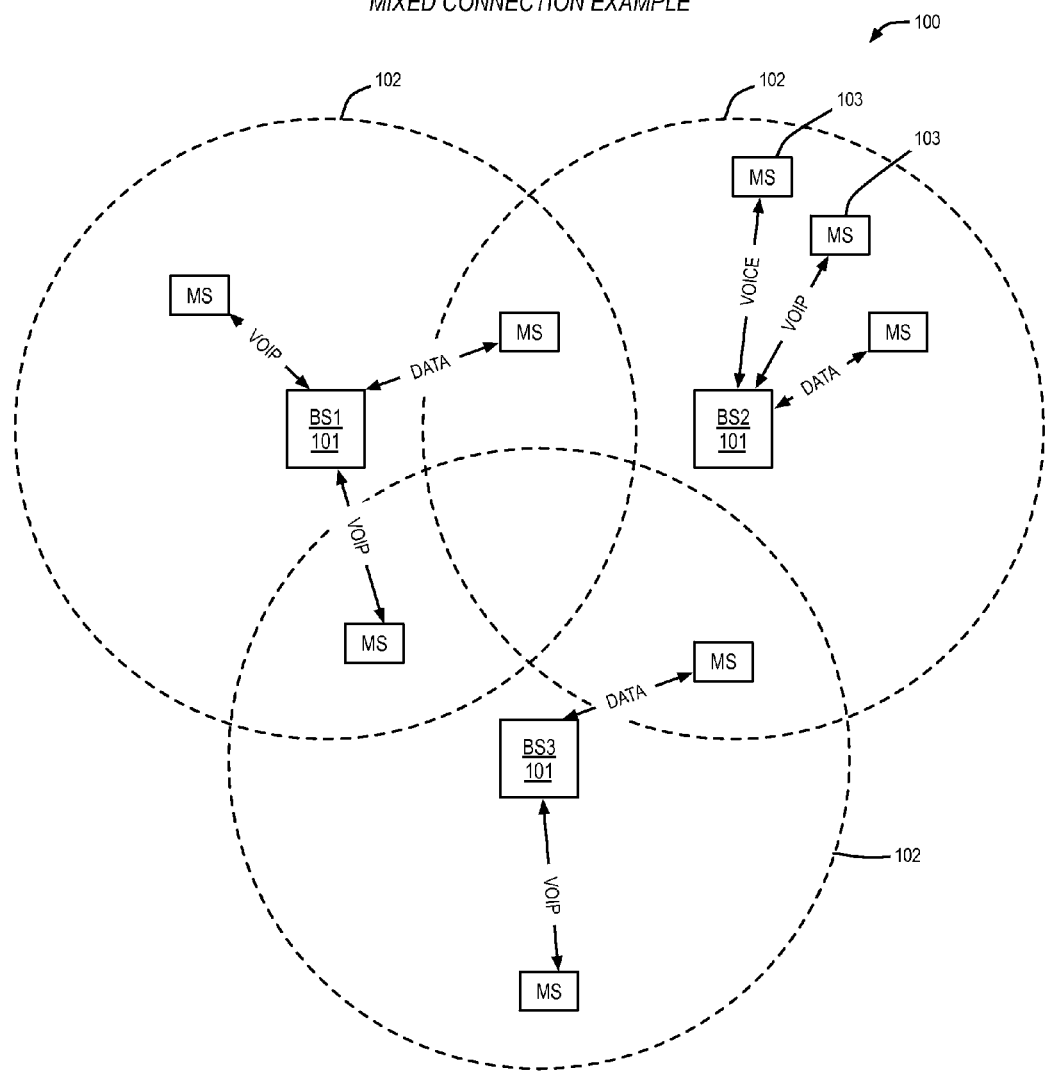
FIG. 1 is a block diagram illustrating an exemplary scenario within a cellular network where a number of base stations are communicating with numerous mobile stations.
Figure 2:
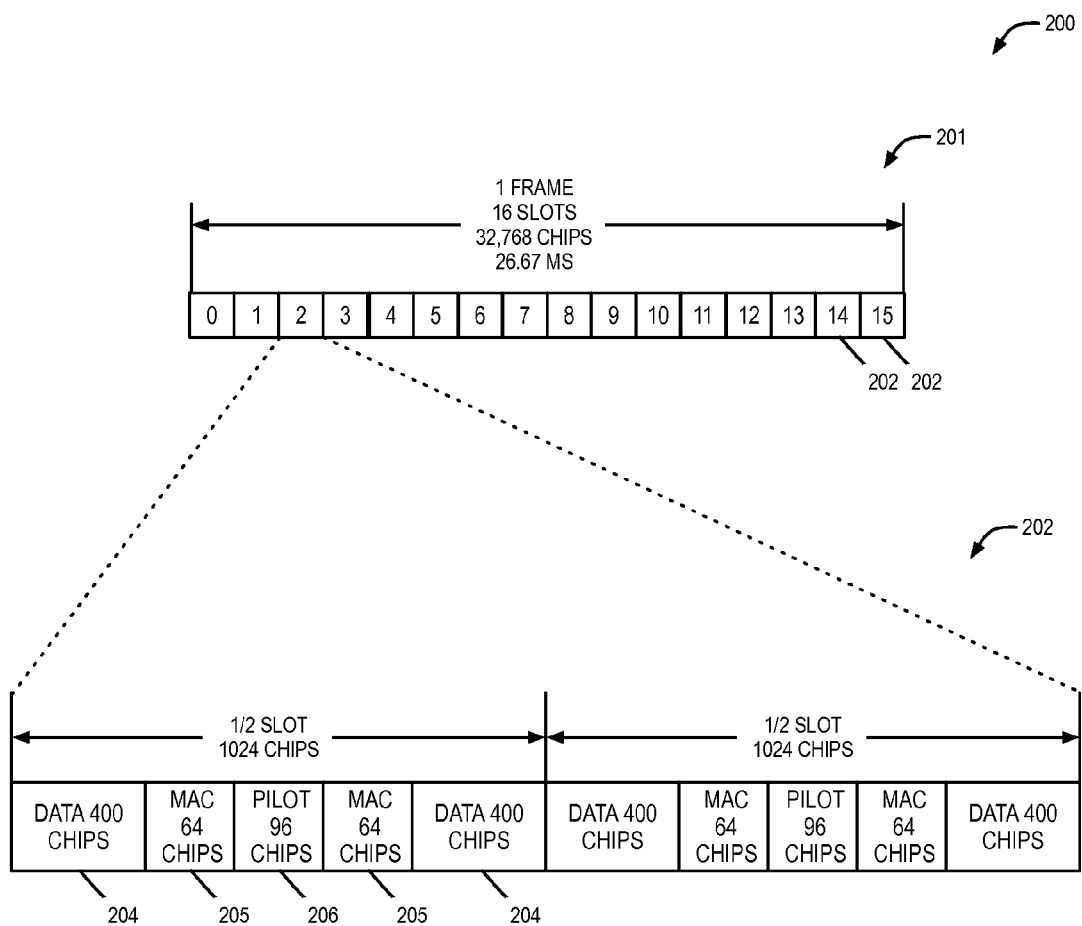
FIG. 2 is a diagram depicting a present data evolution data-optimized (EV-DO) forward link frame which is employed to transfer the data traffic in the example of FIG. 1.

In view of the above background on wireless voice and data networks and associated techniques employed within present day wireless networks for the transfer of data, including voice over internet protocol (VOIP), a discussion of the throughput inefficiencies associated with these techniques invention will now be presented with reference to FIGS. 1-2. Following this, a discussion of the present invention will be provided with reference to FIGS. 3-7. The present invention overcomes the noted throughput limitations associated with present day wireless data transfer mechanisms by providing techniques whereby more data can be delivered to multiple users over existing wireless links. In addition, the present invention provides features that allow for better interference management between adjacent cells. And the mechanisms according to the present invention are fully backwards compatible with existing legacy protocols.

Referring now to FIG. 1, a block diagram 100 is presented illustrating an exemplary scenario within a cellular network where a number of base stations 101 are communicating with numerous mobile stations 103 for a three cellular applications, that is voice, data, and voice over internet protocol (VOIP). The block diagram 100 shows three cellular base stations 101 that each provide for wireless radio communications with one or more mobile stations 103 within their respective areas of coverage 102, also known as cells 102.

Cellular signals are received from and transmitted to a given mobile station 103 by a particular base station 101 when the mobile station 103 is within a cell 102 corresponding to the base station 101, and when the given base station 101 has been assigned to provide for communications with the mobile station 103 by a base station controller (not shown). Accordingly, the strength of the respective transmitted and received signals generally seen by both the mobile station 103 and the given base station 101 is a function of the location of the mobile station 103 at it traverses through a particular cell 102. The number of base stations 101 shown in the diagram, and their respective cells 102, along with the number of mobile stations 103, is presented for illustrative purposes only. As one skilled in the art will appreciate, the number of cells 102 within which a particular mobile station 103 falls is a function of the mobile station's location and the deployment pattern of the base stations 101.

Generally, there is significant overlap of adjacent cells 102 to provide for reliable handoff of a mobile station 103 from one base station 101 to an adjacent base station 101 as the mobile station 103 traverses the cells 102.

The block diagram 100 depicts mobile stations 103 that are employing three modes of cellular communications areas as they send/receive signals to/from the base stations 101. That is, some of the mobiles stations 103 are employing the cellular network to send and receive voice signals, which is conventional voice communications such as a call from one mobile station 101 to either another mobile station 101 or to a telephone over the public switched telephone network (not shown). Other mobile stations 103 are employing the cellular network to transfer data such as email, text messages, and the like. And yet other mobile stations 103 are employing the cellular network to transmit and receive data related to VOIP communications. Presently, the SKYPE® application is widely used for VOIP communications although other applications are available to provide for VOIP. In addition, cellular telecommunication companies are strongly considering the use of VOIP under conditions where conventional voice communication channels are not available or are less desirable over a data communication channel. Thus, technologies are currently being developed which allow for the seamless handover of a call between a voice channel and a data channel within a given cellular network.

There are several extant network types and protocols presently deployed which successfully accomplish the voice communication function noted above such as Global System for Mobile Communications (GSM), which utilizes frequency division multiple access (FDMA) as its principal access technology, and IS-95 (also known as CDMA2000), which utilizes code division multiple access (CDMA) as its principal access scheme. GSM is a somewhat older technology but is prevalently deployed today. CDMA2000 is a newer, more robust access scheme, which is growing in terms of deployment and market share because of its increased user capacity, more reliable signaling techniques, and because it allows for significant growth in the concurrent transmission of packetized data in addition to voice communications.

Likewise, several existing network types and protocols provide for the transfer of data signals, as understood by one of ordinary skill in the art, some application and service, for example the VoIP service are included in data communications, and since data communications are traditionally packet-based schemes, the same protocol within a cellular network is generally used to transfer both kinds of information. One such standard for transmission of data and VOIP signals is the well-known Evolution-Data Optimized (EV-DO) standard, which is also known as Evolution-Data Only. The EV-DO standard defines the protocols that support the transmission of data as described above over a wireless radio network. EV-DO uses multiplexing techniques including CDMA as well as time division multiple access (TDMA) to maximize both individual user's throughput and the overall system throughput. Because EV-DO employs CDMA, it pairs well as the data transfer protocol within networks that utilize CDMA2000 as the protocol for voice communications because of the ability to utilize common hardware within base stations 101 and mobile stations 103 to perform both forms (i.e., voice and data/VOIP) of cellular communications.

EV-DO is in face a variant of CDMA2000 that is oriented toward supporting very high data transfer rates and thus is considered a "3G" protocol by those skilled in the art. An EV-DO channel has a bandwidth of 1.25 MHz, which is the same size of a CDMA2000 channel. And EV-DO employs a similar code division encoding scheme as does CDMA200 channels for voice communications. But the specific EV-DO channel structure, is entirely difference than a CDMA2000 voice channel because the type of data that is transferred over an EV-DO channel is packet-based, and is thus not subject to timing and latency requirements that are mandatory for voice communications over a circuit switched network. In other words, for voice communications, it is generally required to maintain quality of service that voice information be transferred roughly every 20 milliseconds between a mobile station 103 and a base station 101. But there is typically no critical latency requirement related to the transfer of, say, an email message.

Consequently, EV-DO standards provide for a number of different transfer rates from a base station 101 to a mobile station 101 which are based upon the mobile station's ability to reliably receive the data.

Currently, EV-DO networks provide for downlink (or, "forward link") transfers of data to a mobile device 103 up to almost 5 Megabits per second (Mb/s). Uplink (or "reverse link") speeds are much slower.

The primary difference between an EV-DO channel and a CDMA2000 channel is that the EV-DO channel employs time division multiple access (TDMA) techniques to provide data to one or more mobile stations 103 on the same forward link. In contrast to a CDMA2000 voice channel, a mobile station 103 that is communicating over an EV-DO channel has full use of the forward link within a particular cell 102 during a given time period, or "slot." Consequently, a base station 101 that provides for EV-DO is able to employ different modulation schemes for different users, according to the users' ability to receive data. Thus, mobile stations 103 that are in very strong signal reception conditions are served by the base station 101 with very complex modulation techniques that support high transfer rates, while those mobile stations 103 that are in very poor signal reception conditions are served with less complex and more reliable modulation schemes. And the assignment of slots to the mobile stations 103 within a given cell 102 is also determined by a mobile station's ability to receive, that is, those mobile stations 103 that are capable of reliably receiving data are favored by the protocol, thus efficiently utilizing network resources while still providing for data transfer to those mobile stations 103 that can only support low transfer rates.

The ability of EV-DO to tailor data transfer rates to suit more capable mobile stations 103 notwithstanding, the use of VOIP as a means for enhancing a cellular network's ability to process a great number of voice calls has been noted by the present inventors. More specifically, the present inventors have observed several limitations of existing EV-DO technologies when the number of VOIP transactions is increased in within a given cellular coverage area 102. These observations are better understood and will now be discussed with reference to FIG. 2.

Turning to FIG. 2, a diagram 200 is presented depicting a present data packet forward link frame 201 (or "packet" 201) which is employed to transfer the data and VoIP traffic in the example of FIG. 1. The frame 201 includes 16 slots 202, which are time division multiplexed over an CDMA channel to provide for the transmission of data packet. An slot 202 is 1.667 milliseconds in duration, corresponding to 2048 chips of a 1.2288 Megahertz CDMA carrier signal.

Each of the slots 202 comprises sub-frame fields 204-206 that include two pilot sub-frame fields 206, four media access channel (MAC) sub-frame fields 205, and four data sub-frame fields 204. The pilot sub-frames 206 are provided to enable the mobile station to find and identify the CDMA channel. The MAC sub-frames 205 are provided to indicate to the mobile station when and where their respective data traffic is located in the stream. And the data sub-frames 204 comprise the actually data that is being transferred to the mobile station. As one skilled in the art will appreciate, other channels are periodically interlaced into the stream, but the diagram 200 shown is sufficient to teach the limitations of existing technologies along with the present invention.

In operation, one or more slots 202 are assigned to mobile stations within a given cell based upon each of the mobile station's ability to receive data over the channel. In fact, the mobile stations each measure the signal strength of the channel and they each estimate a sustainable data rate that can be received. This information is transmitted back to the base station servicing the cell over a digital rate control (DRC) channel. Accordingly, if a given cell phone is able to sustain a maximum data rate, then scheduling logic within the base station assigns more slots 202 for the transfer, and the modulation scheme for each of the slots 202 is selected to comport with the maximum data rate. Poor receivers are guaranteed a minimum transfer rate.

All mobile stations receive and decode all of the frames 201 that are transmitted, and the information within each of the MAC sub-frames 205 indicate whether a corresponding data sub-frame 204 is intended for a particular mobile station or not. It is important to understand that although many slots 202 within a particular frame 201 may be addressed to a single mobile station, the data sub-frames 204 within each slot 202 are intended only for the single mobile station. In other words, the data sub-frames 204 within a particular slot 202 contain information for the single mobile station, regardless of the quantity of information that is passed over the channel.

A present day forward link supports a number of different modulation schemes to provide for a wide range of receive capabilities for mobile stations within a given sector. And for the transfer of data only, because there are no latency requirements, the existing protocol, such as EV-DO, is indeed effective and bandwidth efficient. However, when VOIP applications are introduced into the mix of data that is being transmitted over an EV-DO channel, timing and latency requirements get added to the factors that a base station must employ to schedule the slots 202 within the EV-DO frames 201 that are transmitted.

Accordingly, it is common practice in the art for a base station to set aside, or reserve periodic slots 202 to support VOIP service because some form of information must be transmitted roughly every 20 milliseconds regardless of whether a corresponding VOIP call is active or idle. And the present inventors have noted that VOIP information is significantly idle, or absent, relative to the frame rate of a given CDMA channel. That is, digitized and packetized voice information is effectively transmitted in bursts because such is the nature of voice communications.

Yet, it is never known to the base station when these bursts will occur, so periodic slots 202, say one slot per frame, must be reserved to support VOIP, regardless of the information content therein. And the present inventors have observed that reserving periodic slots 202 to support a VOIP call within an CDMA channel is very bandwidth inefficient and further limits the throughput of the channel. If one considers reserving one slot 202 within each successive frame 201 to support a given VOIP call, then it follows that 16 VOIP calls will entirely saturate a given channel, and such a scenario does not take into consideration the network load related to data communications within the cell.

Heretofore, the limitations and disadvantages associated with VOIP communications via EV-DO have been tolerable because of the relatively low use of this communications technique. But as the use of VOIP techniques increase, it is anticipated that current EV-DO mechanisms will cease to provide the throughput that will be required.

Accordingly, the present inventors have developed apparatus and methods to expand the capabilities of existing system mechanisms to support higher throughput rates at a slot level. And these apparatus and methods are entirely compatible with existing EV-DO mechanisms. The present invention provides for encoding a number of sub-channels supporting multiple mobile stations within a single slot so that the resources within the single slot for transmitting data are employed more efficiently. The present invention utilized orthogonal frequency division multiplexing (OFDM) techniques to encode up to 16 sub-channels within a single slot 202, thereby allowing unused resources which would be otherwise reserved for use by a single mobile station to be employed more efficiently, thus increasing the throughput of the network. The present invention will now be described with reference to FIGS. 3-7.

Figure 3:
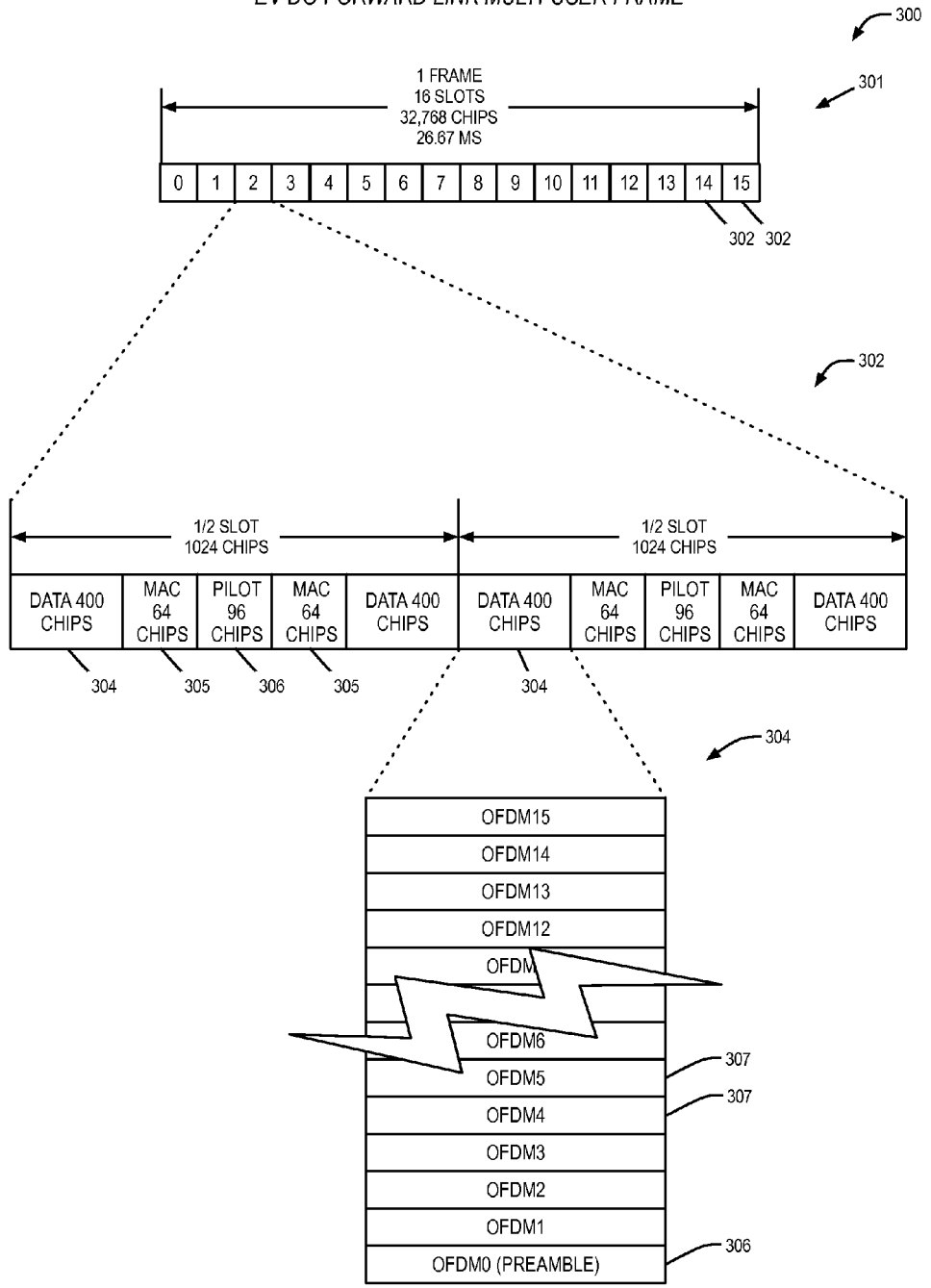
FIG. 3 is a block diagram featuring an EV-DO forward link multi-user frame according to one embodiment of the present invention.

Referring to FIG. 3, according to one embodiment in the present invention, a block diagram 300 is depicted featuring an forward link multi-user frame 301. Like the forward link frame 201 of FIG. 2, the multi-user frame 301 of FIG. 3 includes 16 slots 302, which are time division multiplexed over an CDMA channel. It could be understood by one of the skilled in the art, the frame structure in EV-DO system is presented for illustration.

Each of the slots 302 comprises sub-frame fields 304-306 that include two pilot sub-frame fields 306, four media access channel (MAC) sub-frame fields 305, and four data sub-frame fields 304. The pilot sub-frames 306 are provided to enable the mobile stations to find and identify the CDMA channel. The MAC sub-frames 305 are provided to indicate to the mobile stations when and where their respective data traffic is located in the stream. And the data sub-frames 304 comprise the actually data that is being transferred to the mobile stations.

In contrast to an existing MAC sub-frame 205, a MAC sub-frame 305 according to the present invention contemplates one or more values that indicate data in a corresponding data sub-frame 304 is "shared," that is, the information therein is intended for more than a single mobile station. The one or more values are taken from those spare values within a given network and only those mobile stations that are deployed according to the present invention will recognize such data to be shared. Legacy mobile stations will simple decode the MAC sub-field 305 and determine that the corresponding data sub-field 304 is for another mobile station.

In operation, one or more slots 302 are assigned to mobile stations within a given cell based upon each of the mobile station's ability to receive data over the channel. And in keeping with the base stations, the mobile stations each measure the signal strength of the channel and they each estimate a sustainable data rate that can be received. This information is transmitted back to the base station servicing the cell over a data rate control (DRC) channel. Accordingly, if a given cell phone is able to sustain a maximum data rate, then scheduling logic within the base station assigns more slots 302 for the transfer, and the modulation scheme for each of the slots 302 is selected to comport with the maximum data rate. In addition, when a cell phone enters a particular cell, a base station according to the present invention determines whether or not the particular cell is capable of supporting multi-user frames 301.

All mobile stations within the cell receive and decode all of the frames 301 that are transmitted and, in contrast to present day EV-DO strategies, one or more of the data sub-fields 304 within a slot 302 may comprise a plurality of sub-frame channels 307 which are OFDM encoded and one or more of the plurality of sub-frame channels 307 may be designated for a single user (i.e., a single mobile station) or the one or more sub-frame channels 307 may be mapped to different users. The OFDM sub-frame channels are also known as "tones".

In one embodiment, the tones within a given data sub-frame 304 are generated via modulating the data to be transmitted via a corresponding number of closely-spaced orthogonal sub-carriers and then the tones are summed together prior to CDMA encoding. It is beyond the scope of the present application to provide an in-depth tutorial of the techniques associated with OFDM. It is sufficient to note that OFDM tones as described herein can be effectively employed within a single data sub-frame 304 according to the present invention to provide for multi-user delivery of data within a single EV-DO slot 302.

In addition, one particular OFDM tone 306 is dedicated according to the present invention as a preamble tone 306 for the corresponding data sub-frame 304. That is, the preamble tone 306 includes similar information within the MAC sub-frame 305, that indicates a mapping of the remaining OFDM tones 307 to one or more of a plurality of mobile stations according to the present invention. Accordingly, when a mobile station according to the present invention decodes a MAC sub-frame 305 that indicate a corresponding data sub-frame 304 contains shared OFDM tones 307, then the mobile station will decode the preamble tone 306 to determine which of the remaining tones 307 within the data sub-frame 304 contain information that is addressed to the mobile station. Tones 307 which are addressed to the mobile station, as indicated by the preamble tone, are processed accordingly. Tones 307 which are not addressed to the mobile station are thus discarded.

Consequently, an packet 301 according to the present invention is capable of providing for increased throughput over an forward link channel. This is particularly relevant during scenarios wherein a number of the mobile stations within a given cell or network of cells are utilizing the network for VOIP applications. Thus, during significant portions of a VOIP call when very little data is transmitted, only a portion of the resources associated with a given, reserved slot 302 are employed in association with the call. In one embodiment, only a single tone 307 may be employed to support the call. And the remaining tones 307 can be utilized by the network for transmission of data, or for transmission of information corresponding to other VOIP calls.

In one embodiment, 16 OFDM tones 307 are generated for a given slot 302, where a first tone 306 is designated at the preamble tone 306.

It should be noticed that the order or pattern of OFDM tone 1-15 is not fixed through the transmission. In one embodiment, the order or pattern changes from one quarter slot to the next one quarter slot, or from one symbol to the next symbol. That is when "hopping" occurs. As comprehended by the ordinary people, "hopping" is out of the scope of the present invention. But it should be known that the hopping scheme is predefined for each mobile and base station, and also a function of base station ID, mobile ID, sector ID, etc. Meanwhile, different hopping scheme did not affect the above structure and/or mapping in one of the slots.

Figure 4:
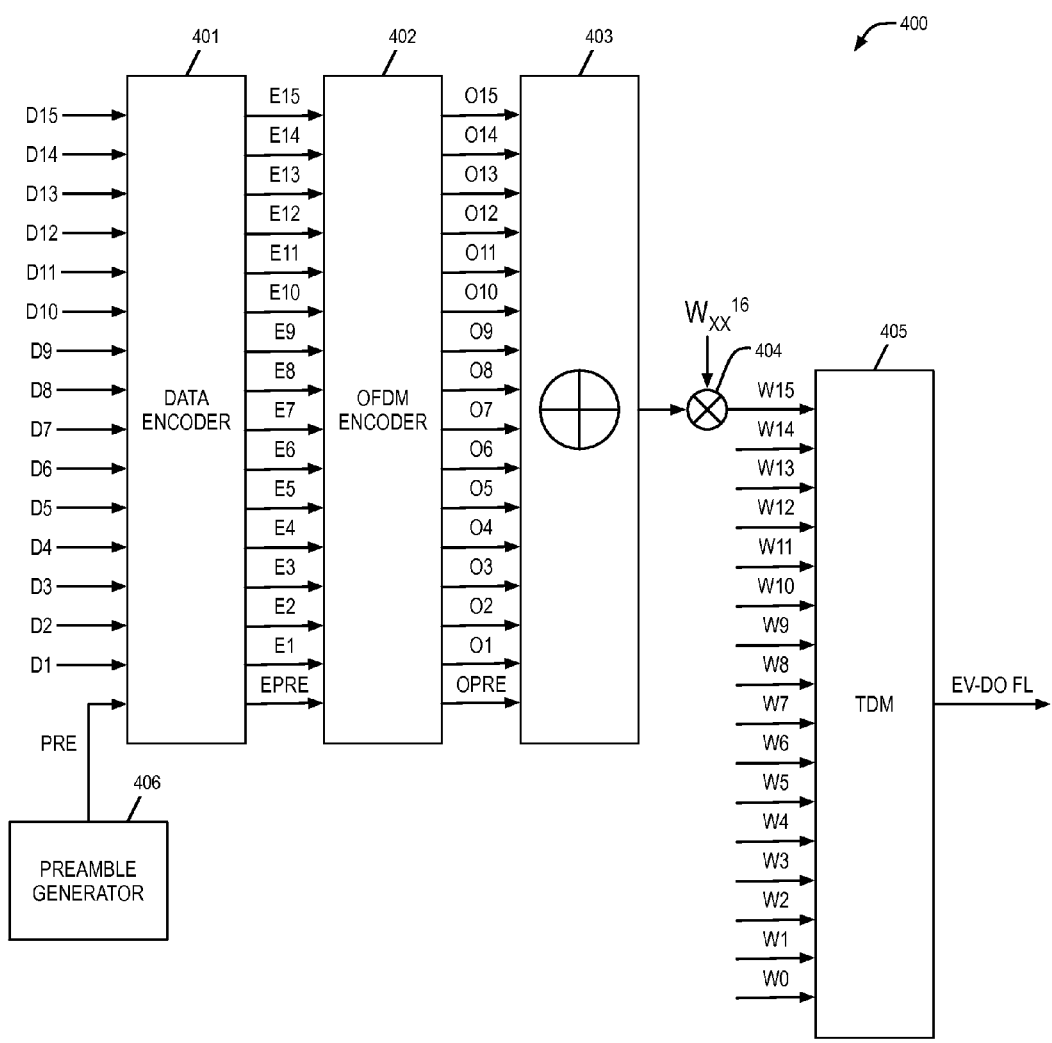
FIG. 4 is a block diagram showing a multi-user base station mechanism according to one embodiment of the present invention.

Now turning to FIG. 4, a block diagram is presented showing a multi-user base station mechanism 400 according to the present invention. The base station 400 includes a data encoder 401 that receives a plurality of data streams D16:D1 along with a preamble stream PRE provided by a preamble generator 406. The data encoder 401 is coupled to an OFDM encoder 402 via a corresponding plurality of encoded data busses E15:E1 along with an encoded preamble bus EPRE. The OFDM encoder 402 is coupled to summation logic 403 via a corresponding number of OFDM tone busses O15:O1 along with an OFDM preamble tone bus OPRE. The summation logic 403 is coupled to a modulator 404, which also receives a Walsh code. The output of the modulator 404 is coupled to one input of a time division multiplexer (TDM) 405. The remaining inputs of the TDM 405 receive Walsh encoded signals from other data corresponding to the remain sub-frame. TDM 405 generates a forward link data output EV-DO FL, which is routed to a transmitter (not shown) within the base station 400 for transmission to mobile stations within a corresponding cellular coverage area.

In operation, data streams (e.g., data or VOIP) D15:D1 according to the present invention are routed to the data encoder 401, which provides for encoding of the information according to scheduling priorities determined by the base station 400. For example, in one embodiment, some of the data streams D15:D1 may be empty, that is null sequences, or sequences void of information. In another embodiment, the data streams D15:D1 may be associated with a corresponding number of mobile stations, that is, 15 streams D15:D1 for each of 15 mobile stations. In another embodiment, a first subset of the data streams D15:D1 correspond to information associated with a single mobile station. The preamble generator 406 provides information over bus PRE that indicates a mapping of data stream D15:D1 to mobile station.

The encoded data E15:E1 and preamble EPRE are routed to the OFDM encoder 402, which generates the corresponding plurality of OFDM tones O15:O1 along with the preamble tone OPRE according to known OFDM modulation methods. The OFDM tones O15:O1 and preamble OPRE are summed together by the summing logic 403 to produce a composite tone which is modulated by one of a plurality of Walsh codes by the modulator 404. The output of the modulator 404, W15, is routed along with a remaining number of Walsh modulated streams W14:W0 to the TDM 405, which generates the EV-DO FL stream in accordance with scheduling parameters determined by the base station 400. It is noted that the TDM 405 does not multiplex each of the Walsh streams W15:W0 in successively or in equal slot times, but rather generates an EV-DO forward link slot stream where one of the Walsh streams W15:W0 is provided in a given EV-DO FL slot. For example, scheduling priorities may determine that a subset of the Walsh streams W15:W0 be allocated slots during a following number of EV-DO packets and thus the TDM provides the EV-DO FL stream accordingly. In one embodiment, the OFDM encoded Walsh stream W15 is multiplexed by the TDM 405 into one or more EV-DO slots.

In one embodiment, there are 15 data streams D15:D1 produce a corresponding number of OFDM tones O15:O1 along with a preamble tone OPRE indicating a mapping of tones O15:O1 to mobile station. Other numbers of tones are additionally contemplated such as 8 tones 32 tones, and 64 tones.

Figure 5:
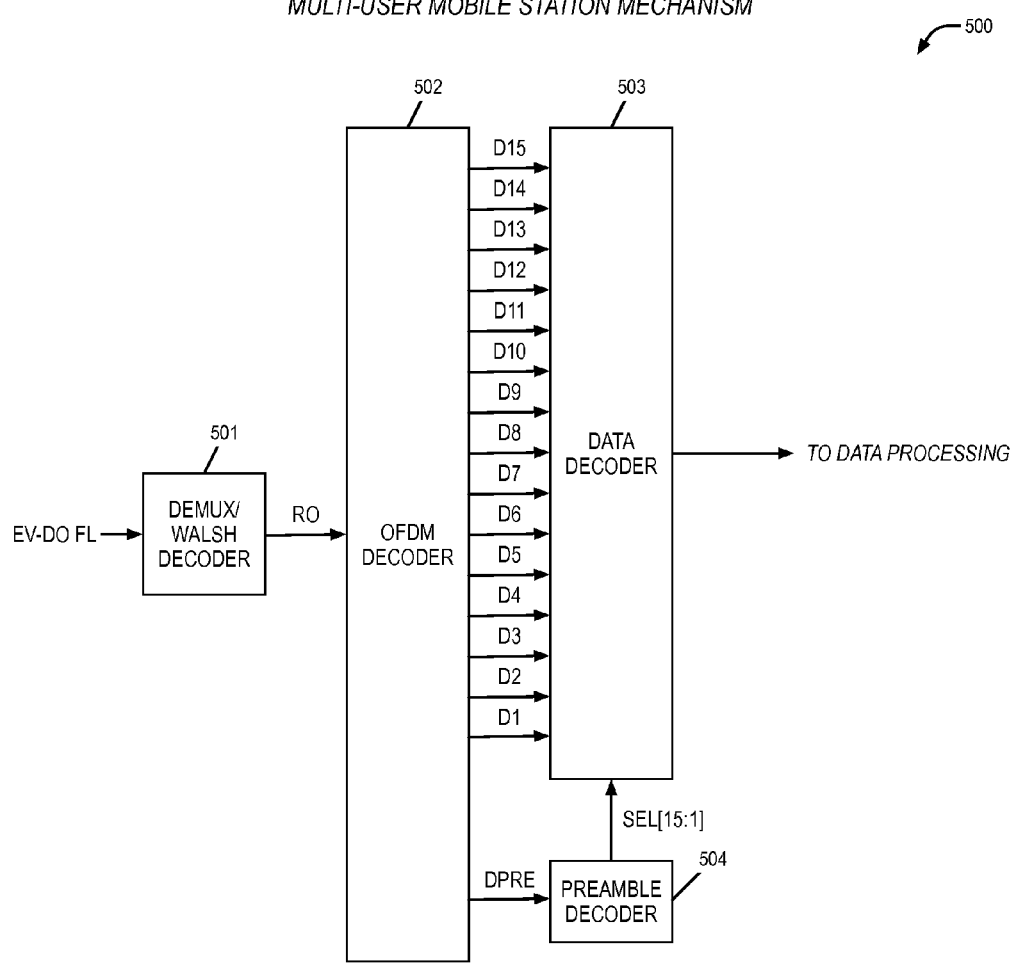
FIG. 5 is a block diagram illustrating a multi-user mobile station mechanism according to one embodiment of the present invention.

Turning now to FIG. 5, a block diagram is presented illustrating a multi-user mobile station mechanism 500 according to the present invention. The mobile station 500 includes a demultiplexer/decoder 501 that receives a multi-user EV-DO forward link stream as generated and transmitted by the base station 400 of FIG. 4. The demultiplexer/decoder 501 outputs one of a plurality of slot streams RO that have been generated by the base station 400 and which is designated as a shared slot stream by a corresponding MAC sub-frame field. Accordingly, slot stream RO may be generated in an existing EV-DO configuration at intervals described above with reference to FIG. 3.

The shared slot stream RO is coupled to an OFDM decoder, which decodes the additive stream RO into a plurality of OFDM tone streams D15:D1 and a corresponding OFDM preamble tone stream DPRE. The preamble tone stream DPRE is coupled to a preamble decoder 504. The remaining tone streams D15:D1 are coupled to a data decoder 503. The preamble decoder, in accordance with the information encoded in the preamble tone DPRE, indicates on a select bus SEL[15:1] which of the tone streams D15:D1 are addressed to the particular mobile station 500. Those streams D15:D1 which are addressed to the mobile station 500 are decoded by the data decoder and subsequently sent to data processing logic (not shown) within the mobile station. Those streams D15:D1 which are not addressed to the mobile station 500 are discarded.

Accordingly, low data rate information, such as VOIP data, can be OFDM multiplexed along with other data within a single EV-DO packet according to the present invention, thus increasing the throughput of a CDMA channel and providing the capability to serve more VOIP users over that which has heretofore been provided. In addition, the present invention allows for compatibility with legacy users as well.

In addition to the above-noted features and advantages, the present invention provides a very useful technique for managing sub-band interference. That is, in the scenario where adjacent base stations are transmitting CDMA channels on adjacent channel frequencies, conditions may exist where one or more mobile stations within a given base station's cell are operating under less than desirable reception conditions because of interference resulting from an adjacent base station's transmissions. One such example is when a mobile station is on the fringe or intersection of two adjacent cells served by base stations transmitting in adjacent frequency bands.

The present invention overcomes the above limitation, and more, by providing a mechanism whereby particular subsets of OFDM tones, as described above, are exclusively allocated to adjacent base stations for transmission in a multi-user EV-DO packet slot for those mobile stations exhibiting weak reception.

Figure 6:
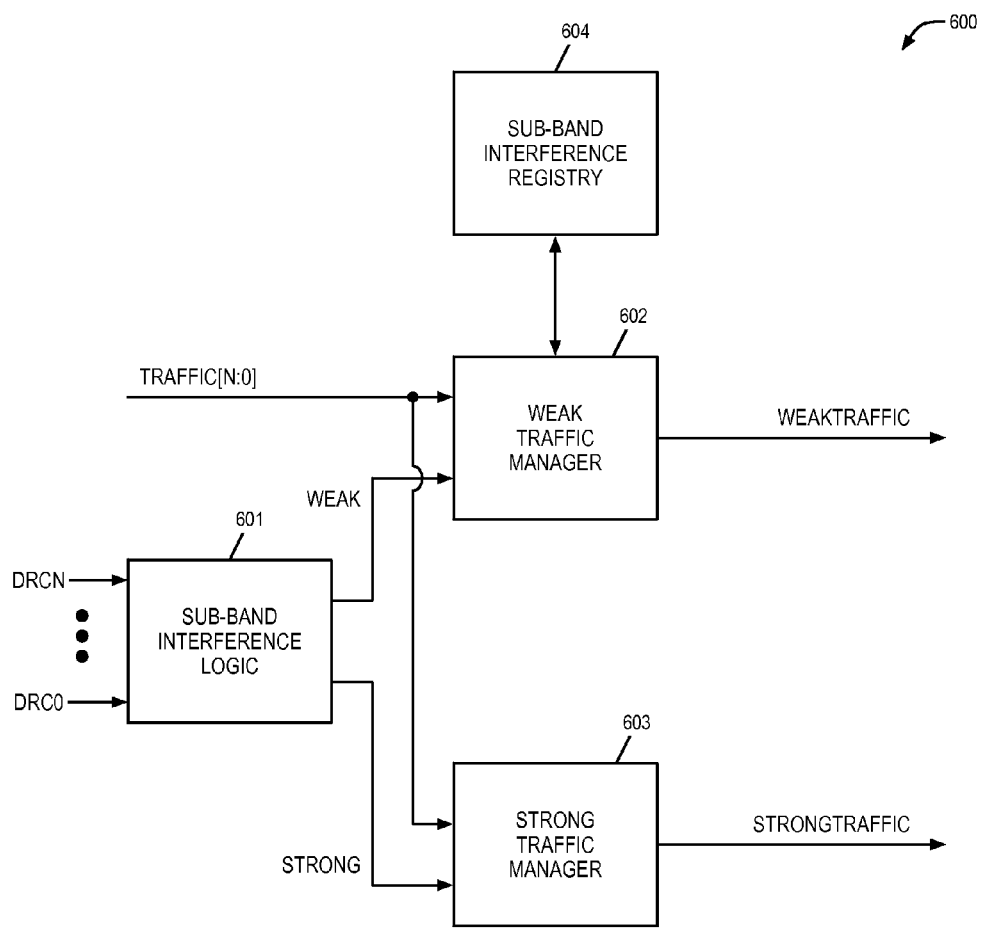
FIG. 6 is a block diagram detailing a base station mechanism according to the one embodiment of present invention for managing sub-band interference.

Turning now to FIG. 6, a block diagram is presented detailing a base station mechanism 600 according to the present invention for managing sub-band interference. The base station 600 includes sub-band interference logic 601 that receives a plurality of DRC channels DRCN:DRC0 from a corresponding number of mobile stations which have been assigned to the base station 600 by a base station controller (not shown). Based upon the values of the DRC channels DRCN:DRC0, the sub-band interference logic 601 determines whether the mobile stations fall into either a strong traffic category or a weak traffic category by comparing with a threshold, which will be illustrated later. Indications of these stations are provided to a weak traffic manager 602 via weak traffic bus WEAK and to a strong traffic manage 603 via a strong traffic bus STRONG. Traffic (e.g., data and/or VOIP streams) corresponding to each of the mobile stations is provided to both the strong traffic manager 603 and the weak traffic manager 602 via a traffic bus TRAFFIC[N:0]. A sub-band interference registry 604 is also coupled to the weak traffic manager 602. The weak traffic manager 602 generates OFDM tones corresponding to the weak traffic on bus WEAKTRAFFIC and the strong traffic manager 603 generates OFDM tones corresponding to the strong traffic on bus STRONGTRAFFIC.

In operation, if the DRC value of a given mobile station is below a threshold, as determined by configuration, so as to be designated as a weak user, the sub-band interference logic 601 indicates this case to the weak traffic manager 602 via bus WEAK. The weak traffic manager 602 subsequently generates OFDM tones for the weak user. If the DRC value of the given mobile station is above the threshold so as to be designated as a strong user, the sub-band interference logic 601 indicates this case to the strong traffic manager 603 via bus STRONG. The strong traffic manager 603 subsequently generates OFDM tones for the strong user.

Traffic for strong users employs all of the OFDM tones provided for by a given configuration, for example, as described above with reference to FIGS. 3-5. However, traffic for weak users is generated on a designated subset of the OFDM tones provided for by the given configuration, where adjacent base stations 600 employ exclusively different subsets of the available OFDM tones. Typically, the subset of tones available for a particular base station 600 are stored in the sub-band interference registry 604 and are only used to generate the weak traffic stream. This approach to sub-band interference management is more particularly illustrated with in FIG. 7.

FIG. 7 is a block diagram 700 showing EV-DO data sub-frames 701, 704, 707 corresponding the three base stations according to the present invention when the base stations are communicating with mobile stations in a sub-band interference reduction mode. Each of the data sub-frames 701, 704, 707 has a plurality of OFDM tones 702, 705, 708 along with a preamble tone 703, 706, 709 that maps the associated OFDM tones 702, 705, 708 to one or more mobile stations within the base station's respective cells.

To preclude interference in adjacent cells, weak traffic signals as described above with reference to FIG. 6 are OFDM encoded into exclusive tone subsets for transmission. For example, the diagram 700 shows that base station 1 only uses tones OFDM5:OFDM1 for transmission to its weak mobile stations. Base station 2 only uses tones OFDM 10:OFDM6 for transmission to its weak mobiles. And base station 3 only uses tones OFDM15:OFDM11 for transmission to its weak mobile stations. Accordingly, the mobile stations that are designated as weak by respective base stations only receive OFDM traffic on the designated tones and thus interference by adjacent base stations is reduced. Strong traffic from any of the base stations utilizes all available OFDM tones for transmission.

In one embodiment in the present invention, the base stations such as BS 101 shown in FIG. 1, are connected with a RNC (radio network controller), the RNC is used to transfer the data with core network. The RNC and core network are not shown in figures, but the ordinary skilled people will know the connection, configuration or any possible changes of the RNC structure. When the data rate control signal sent to one base station is less than the threshold, the corresponding mobile station may communicate with more than one base station which all of the data rate control signals sent to them is less than the threshold, that is the mobile is traversing from one cell to another, or the mobile is working in the edge in one cell. The RNC received the report signal from the base station about the mobile status such as location and traversing, and indicate the related base stations to assign different subsets of sub-band to the mobile device. The assigned subsets are non-overlap in frequency domain.

Furthermore, in another slot or sub-frame, the preamble may relate and assign to another mobile station, and the RNC will re-arrange the scheme of the subsets of the base station.

Those skilled in the art should appreciate that they can readily use the disclosed conception and specific embodiments as a basis for designing or modifying other structures for carrying out the same purposes of the present invention, and that various changes, substitutions and alterations can be made herein without departing from the scope of the invention as defined by the appended claims.

What is claimed is:

1. A base station wirelessly coupled to a plurality of mobile devices, comprising:
    a data encoder, configured to receive a preamble signal and a plurality of data streams, which are encoded into a corresponding preamble tone and a corresponding plurality of tones, wherein the preamble tone indicates a mapping of the plurality of tones in response to one or more of the plurality of mobile devices, and wherein the preamble tone indicates at least one of the plurality of tones which are addressed to a particular mobile device, and wherein the preamble tone is not fixed to the selected particular mobile device through communication; and
    a time division multiplexer, coupled to said data encoder, configured to multiplex the preamble tone and the plurality of tones in timely fashion for receipt by the plurality of mobile devices.

2. The base station as recited in claim 1, the base station further comprising a modulator coupled to the data encoder, which is configured to sum and modulate the plurality of tones and preamble tone with a Walsh code.

3. The base station as recited in claim 1, wherein the plurality of mobile devices receive and measure the strength of the plurality of tones and transmit a plurality of data rate control signals which are corresponding with the plurality of mobile devices to the base stations, the base station further comprising:
    a comparing unit, configured to receive and compare the plurality of data rate control signals with a threshold, wherein when one or more of the plurality of data rate control signals are less than the threshold, indicate said one or more corresponding data rate control signals as a first traffic set, and indicate the remaining of the plurality of data rate control signals as a second traffic set;
    a first traffic manager, coupled to the comparing unit, configured to receive the first traffic set, and assign a first designated subset of the plurality of tones to the corresponding plurality of mobile devices; and
    a second traffic manager, coupled to the comparing unit, configured to receive the second traffic set, and assign a second designated subset of the plurality of tones to the corresponding mobiles devices,
    wherein the second designated subset comprises more tones than the first designate subset.

4. A method for a base station wirelessly coupled to a plurality of mobile devices, comprising:
    receiving and encoding a preamble signal and a plurality of data streams into a corresponding preamble tone and a corresponding plurality of tones, wherein the preamble tone indicates a mapping of the plurality of tones in response to one or more of the plurality of mobile devices, and wherein the preamble tone indicates at least one of the plurality of tones which are addressed to a particular mobile device, and wherein the preamble tone is not fixed to the selected particular mobile device through communication; and
    multiplexing the preamble tone and the plurality of tones in timely fashion for receipt by the plurality of mobile devices.

5. The method as recited in claim 4, the method further comprising summing and modulating the plurality of tones and preamble tone with a Walsh code.

6. The method as recited in claim 4, the plurality of mobile devices receive and measure the strength of the plurality of tones and transmit a plurality of data rate control signals which are corresponding with the plurality of mobile devices, the method further comprising:
    receiving and comparing the plurality of data rate control signals with a threshold, wherein when one or more of the plurality of data rate control signals are less than the threshold, indicating said one or more corresponding data rate control signals as a first traffic set, and indicating the remaining of the plurality of data rate control signals as a second traffic set;
    according to the first traffic set, assigning a first designated subset of the plurality of tones to the corresponding plurality of mobile devices; and
    according to the second traffic set, assigning a second designated subset of the plurality of tones to the corresponding mobiles devices,
    wherein the second designated subset comprises more tones than the first designate subset.

7. A mobile device wirelessly coupled to a plurality of base stations, comprising:
    a decoder, configured to demultiplex and decode a plurality of tones received from at least one of the plurality of base stations;
    a preamble decoder, configured to decode a preamble tone received from at least one of the plurality of base stations, wherein the decoded preamble tone indicates one or more of the plurality of tones are transmitted for the mobile device, and wherein the preamble tone is not fixed to the mobile device through communication; and a processor, coupled to said decoder and said preamble decoder, configured to process one or more of the plurality of tones indicated by the decoded preamble tone, and send a data rate control signal of the corresponding base station.

8. The mobile device as recited in claim 7, wherein the data rate control signal indicates a maximum data sustained by the mobile device according to any combination of the features selected form the group comprising:
   acceptable data error rate;
   channel capacity; and
   loss rate of radio link.

9. The mobile device as recited in claim 7, wherein the mobile device is assigned with a plurality of designated subsets by the plurality of base stations, the corresponding designated subsets are non-overlap in the frequency domain.

10. A method for a mobile device wirelessly coupled to a plurality of base stations, comprising:
   demultiplexing and decoding a plurality of tones received from one of the plurality of base stations;
   decoding a preamble tone received from one of the plurality of base stations, wherein the decoded preamble tone indicates one or more of the plurality of tones are transmitted for the mobile device, and wherein the preamble tone is not fixed to the mobile device through communication;
   processing one or more of the plurality of tones indicated by the decoded preamble tone; and
   sending a data rate control signal of the corresponding base station.

11. The method as recited in claim 10, wherein the data rate control signal indicates a maximum data sustained by the mobile device according to any combination of the features selected form the group comprising:
   acceptable data error rate;
   channel capacity; and
   loss rate of radio link.

12. The method as recited in claim 10, wherein the mobile device is assigned with a plurality of designated subsets by the plurality of base stations, the corresponding designated subsets are non-overlap in the frequency domain.

13. A system, comprising:
   a plurality of base stations, each of the plurality of base stations further comprising:
      a data encoder, configured to receive a preamble signal and a plurality of data streams, which are encoded into a corresponding preamble tone and a corresponding plurality of tones, wherein the preamble tone indicates a mapping of the plurality of tones in response to one or more of the plurality of mobile devices, and wherein the preamble tone indicates at least one of the plurality of tones which are addressed to a particular mobile device, and wherein the preamble tone is not fixed to the selected particular mobile device through communication; and
      a time division multiplexer, coupled to said data encoder, configured to multiplex the preamble tone and the plurality of tones in timely fashion for receipt by the plurality of mobile devices; and
   a plurality of mobile devices, wirelessly couple to one or more of the plurality of base stations, each of the plurality of mobile devices further comprising:
      a decoder, configured to demultiplex and decode the plurality of tones received from at least one of the plurality of base stations;
      a preamble decoder, configured to decode the preamble tone received from at least one of the plurality of base stations, wherein the decoded preamble tone indicates one or more of the plurality of tones are transmitted for the mobile device; and
      a processor, coupled to said decoder and said preamble decoder, configured to process one or more of the plurality of tones indicated by the decoded preamble tone, and send a data rate control signal of the corresponding base station.

14. The system as recited in claim 13, further comprising a radio network controller coupled to the plurality of base stations, wherein when the mobile station is assigned by one or more of the plurality of base stations, and if the data rate control signals transmitted to the corresponding one or more of the plurality of base stations indicates less than a threshold, the radio network controller indicates the one or more of the plurality of base stations to assign a plurality of exclusive subsets of tones to the mobile device.

15. The system as recited in claim 13, wherein the data rate control signal indicates a maximum data sustained by the mobile device according to any combination of the features selected form the group comprising:
   acceptable data error rate;
   channel capacity; and
   loss rate of radio link.

* * * * *